(12) United States Patent
Wang et al.

(10) Patent No.: US 10,966,183 B2
(45) Date of Patent: Mar. 30, 2021

(54) BEAM INDICATION CONSIDERING BEAM FAILURE RECOVERY IN NEW RADIO

(71) Applicant: APPLE INC., Cupertino, CA (US)

(72) Inventors: Guotong Wang, Beijing (CN); Alexei Davydov, Nizhny Novgorod (RU); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 62 days.

(21) Appl. No.: 16/245,970

(22) Filed: Jan. 11, 2019

(65) Prior Publication Data
US 2019/0239212 A1    Aug. 1, 2019

(30) Foreign Application Priority Data

Jan. 12, 2018 (WO) ................ PCT/CN2018/072385
Jan. 12, 2018 (WO) ................ PCT/CN2018/072452

(51) Int. Cl.
*H04W 72/04* (2009.01)
*H04L 5/00* (2006.01)
(Continued)

(52) U.S. Cl.
CPC ...... *H04W 72/0413* (2013.01); *H04B 7/0695* (2013.01); *H04B 7/088* (2013.01);
(Continued)

(58) Field of Classification Search
CPC .. H04B 7/0408; H04B 7/0617; H04B 7/0695; H04B 7/088; H04L 5/0051; H04W 16/28;
(Continued)

(56) References Cited

U.S. PATENT DOCUMENTS 9,900,891 B1 *  2/2018  Islam ................... H04W 72/042
10,506,587 B2 * 12/2019  Guo ..................... H04W 72/042
(Continued)

FOREIGN PATENT DOCUMENTS

WO    WO-2019049096 A1 *  3/2019  ........... H04L 5/0044

OTHER PUBLICATIONS

3rd Generation Partnership Project, Technical Specification 38.214, Physical layer procedures for data, Dec. 2017, 3GPP, Release 15, Version 15.0.0 (Year: 2017).*
(Continued)

*Primary Examiner* — Eric Nowlin

(57) ABSTRACT

Technology for a user equipment (UE) configured to perform beam failure recovery. The UE can encode a beam failure recovery (BFR) request for transmission on a physical random-access channel (PRACH) or a physical uplink control channel (PUCCH) to a next generation node B (gNB). The UE can monitor a dedicated physical downlink control channel (PDCCH) control resource set (CORESET) for a response from the gNB to the beam failure recovery request. The UE can select a default physical downlink shared channel (PDSCH) beam, wherein it is assumed, at the UE that a same quasi co-location (QCL) assumption for a PDSCH as a QCL assumption for the dedicated PDCCH CORESET; or a PDSCH demodulation reference signal (DMRS) is QCLed with a downlink (DL) reference signal (RS) of an identified candidate beam by the UE. The UE can decode a beam failure recovery request response from the gNB.

19 Claims, 13 Drawing Sheets

(51) Int. Cl.

| | | |
|---|---|---|
| *H04W 68/02* | (2009.01) | |
| *H04W 48/10* | (2009.01) | |
| *H04W 72/14* | (2009.01) | |
| *H04W 48/12* | (2009.01) | |
| *H04B 7/06* | (2006.01) | |
| *H04B 7/08* | (2006.01) | |
| *H04W 56/00* | (2009.01) | |
| *H04W 74/08* | (2009.01) | |

(52) U.S. Cl.
CPC ........... *H04L 5/0051* (2013.01); *H04W 48/10* (2013.01); *H04W 48/12* (2013.01); *H04W 68/02* (2013.01); *H04W 72/14* (2013.01); *H04W 56/001* (2013.01); *H04W 74/0833* (2013.01)

(58) Field of Classification Search
CPC ... H04W 48/10; H04W 48/12; H04W 56/001; H04W 68/02; H04W 72/046; H04W 72/14; H04W 74/0833
See application file for complete search history.

(56) References Cited

U.S. PATENT DOCUMENTS

| | | | |
|---|---|---|---|
| 2018/0278467 A1* | 9/2018 | John Wilson | H04W 72/046 |
| 2018/0343653 A1* | 11/2018 | Guo | H04L 5/0053 |
| 2019/0053288 A1* | 2/2019 | Zhou | H04B 7/0695 |
| 2019/0053314 A1* | 2/2019 | Zhou | H04B 7/0626 |
| 2019/0081688 A1* | 3/2019 | Deenoo | H04L 5/0055 |
| 2019/0132827 A1* | 5/2019 | Kundargi | H04W 24/10 |
| 2019/0141691 A1* | 5/2019 | Kwon | H04B 7/0695 |
| 2019/0159100 A1* | 5/2019 | Liou | H04L 5/0091 |
| 2019/0166555 A1* | 5/2019 | Cheng | H04W 72/14 |
| 2019/0200248 A1* | 6/2019 | Basu Mallick | H04L 41/0672 |
| 2019/0215820 A1* | 7/2019 | Cirik | H04W 76/19 |
| 2019/0215888 A1* | 7/2019 | Cirik | H04B 7/0695 |
| 2019/0222284 A1* | 7/2019 | Huang | H04L 5/0048 |
| 2019/0222289 A1* | 7/2019 | John Wilson | H04L 1/1607 |
| 2019/0239212 A1* | 8/2019 | Wang | H04L 5/0053 |
| 2019/0254045 A1* | 8/2019 | Sadiq | H04B 7/0617 |
| 2019/0274098 A1* | 9/2019 | Cheng | H04L 5/0091 |
| 2019/0297648 A1* | 9/2019 | Nagaraja | H04B 7/0695 |
| 2019/0306924 A1* | 10/2019 | Zhang | H04W 72/046 |
| 2019/0313445 A1* | 10/2019 | Tsai | H04L 27/2666 |
| 2019/0320333 A1* | 10/2019 | Koskela | H04L 5/0053 |
| 2019/0349915 A1* | 11/2019 | Ahn | H04L 5/0048 |
| 2019/0373450 A1* | 12/2019 | Zhou | H04W 74/0833 |
| 2019/0379431 A1* | 12/2019 | Park | H04B 7/0408 |
| 2020/0053767 A1* | 2/2020 | Bai | H04B 7/0695 |
| 2020/0059285 A1* | 2/2020 | Zhang | H04W 24/10 |
| 2020/0059951 A1* | 2/2020 | Frenne | H04L 5/0057 |
| 2020/0076492 A1* | 3/2020 | Wu | H04W 72/046 |
| 2020/0077395 A1* | 3/2020 | Guo | H04W 72/042 |
| 2020/0100154 A1* | 3/2020 | Cirik | H04W 36/06 |
| 2020/0136715 A1* | 4/2020 | Venugopal | H04W 72/0453 |
| 2020/0136895 A1* | 4/2020 | Venugopal | H04L 41/0668 |
| 2020/0137588 A1* | 4/2020 | Zhang | H04W 16/28 |
| 2020/0267048 A1* | 8/2020 | Yu | H04L 41/0654 |
| 2020/0288479 A1* | 9/2020 | Xi | H04B 7/02 |

OTHER PUBLICATIONS

Huawei et al., Discussion on link recovery procedure for beam blockage, Feb. 17, 2017, 3GPP, 3GPP TSG RAN WG1 Meeting #88, Tdoc: R1-1701716 (Year: 2017).*
NTT Docomo, Inc., Views on mechanism to recover from beam failure, Feb. 17, 2017, 3GPP, 3GPP TSG RAN WG1 Meeting #88, Tdoc: R1-1702799 (Year: 2017).*
Samsung, Recovery mechanisms for beam failure scenarios, Feb. 17, 2017, 3GPP, 3GPP TSG RAN WG1 Meeting #88, Tdoc: R1-1702938 (Year: 2017).*
Sharp, Discussion on mechanisms for beam failure recovery, Sep. 21, 2017, 3GPP, 3GPP TSG RAN WG1 NR Ad-Hoc#3 Meeting, Tdoc: R1-1716268 (Year: 2017).*
Intel Corporation, Remaining Issues on Beam Failure Recovery, Sep. 21, 2017, 3GPP, 3GPP TSG-RAN WG1 Meeting NR #3, Tdoc: R1-1716295 (Year: 2017).*
National Instruments, Details of Improved Beam Failure Handling, Sep. 21, 2017, 3GPP, 3GPP TSG RAN WG1 Meeting NR #3, Tdoc: R1-1716543 (Year: 2017).*
Sharp, Discussion on mechanisms for beam failure recovery, Sep. 21, 2017, 3GPP, 3GPP TSG RAN WG1 NR Ad-Hoc#3 Meeting, Tdoc: R1-1716660 (Year: 2017).*
Samsung, Beam failure recovery, Sep. 21, 2017, 3GPP, 3GPP TSG RAN WG1 Meeting NR#3, Tdoc: R1-1715941 (Year: 2017).*
LG Electronics, Discussion on beam failure recovery, Sep. 21, 2017, 3GPP, 3GPP TSG RAN WG1 Meeting NR#3, Tdoc: R1-1715860 (Year: 2017).*
CATT, Beam failure detection and recovery, Sep. 21, 2017, 3GPP, 3GPP TSG RAN WG1 Meeting NR#3, Tdoc: R1-1715802 (Year: 2017).*
Huawei et al., Relationship between beam failure recovery and RLF, Sep. 21, 2017, 3GPP, 3GPP TSG RAN WG1 Meeting AH NR#3, Tdoc: R1-1715720 (Year: 2017).*
Samsung, Trigger condition for beam failure recovery, Feb. 17, 2017, 3GPP, 3GPP TSG RAN WG1 Meeting #88, Tdoc: R1-1702939 (Year: 2017).*
CATT, Beam failure detection and recovery, Aug. 25, 2017, 3GPP, 3GPP TSG RAN WG1 #90, Tdoc: R1-1712379 (Year: 2017).*
Intel Corporation, Discussion for Mechanism to Recover from Beam Failure, Aug. 25, 2017, 3GPP, 3GPP TSG RAN WG1 Meeting #90, Tdoc: R1-1712552 (Year: 2017).*
AT&T, Mechanisms to recover from beam failure, Aug. 25, 2017, 3GPP, 3GPP TSG RAN WG1 # 90, Tdoc: R1-1712713 (Year: 2017).*
Vivo, On beam failure recovery procedure, Aug. 25, 2017, 3GPP, 3GPP TSG RAN WG1 Meeting #90, Tdoc: R1-1712839 (Year: 2017).*
NEC, Discussion on beam failure recovery, Aug. 25, 2017, 3GPP, 3GPP TSG RAN WG1 Meeting #90, Tdoc: R1-1712998 (Year: 2017).*
Spreadtrum Communications, Discussion on UE initiated recovery from beam failure, Aug. 25, 2017, 3GPP, 3GPP TSG RAN WG1 Meeting #90, Tdoc: R1-1713047 (Year: 2017).*
LG Electronics, Discussion on beam failure recovery, Aug. 25, 2017, 3GPP, 3GPP TSG RAN WG1 Meeting #90, Tdoc: R1-1713151 (Year: 2017).*
Sharp, Discussion on mechanisms for beam failure recovery, Aug. 25, 2017, 3GPP, 3GPP TSG RAN WG1#90 Meeting, Tdoc: R1-1713327 (Year: 2017).*
Samsung, Beam failure recovery, Aug. 25, 2017, 3GPP, 3GPP TSG RAN WG1 Meeting #90, Tdoc: R1-1713597 (Year: 2017).*
Huawei et al., A holistic procedure for beam failure recovery, Aug. 25, 2017, 3GPP, 3GPP TSG RAN WG1 Meeting #90, Tdoc: R1-1713758 (Year: 2017).*
NTT Docomo, Inc., Further views on mechanism to recover from beam failure, Aug. 25, 2017, 3GPP, 3GPP TSG RAN WG1 #90, Tdoc: R1-1713919 (Year: 2017).*
InterDigital, Inc, On Remaining Details of Beam Failure Recovery, Aug. 25, 2017, 3GPP, 3GPP TSG RAN WG1 Meeting #90, Tdoc: R1-1714142 (Year: 2017).*
Ericsson, Mechanism to recover from beam failure, Aug. 25, 2017, 3GPP, 3GPP TSG-RAN WG1 #90, Tdoc: R1-1714293 (Year: 2017).*
Huawei et al., Beam Failure Recovery Design Details, Sep. 21, 2017, 3GPP, 3GPP TSG RAN WG1 Meeting AH NR#3, Tdoc: R1-1715468 (Year: 2017).*
Huawei et al., A holistic procedure for beam failure recovery, Sep. 21, 2017, 3GPP, 3GPP TSG RAN WG1 Meeting Ad Hoc#3, Tdoc: R1-1715587 (Year: 2017).*
Huawei et al., Network-side beam failure detection and new candidate beam identification, Sep. 21, 2017, 3GPP, 3GPP TSG RAN WG1 Meeting Ad Hoc, Tdoc: R1-1715588 (Year: 2017).*
Huawei et al., Beam indication for network-based beam failure recovery, Sep. 21, 2017, 3GPP, 3GPP TSG RAN WG1 Meeting Ad Hoc #3, Tdoc: R1-1715589 (Year: 2017).*

(56) References Cited

OTHER PUBLICATIONS

Vivo, Discussion on beam failure recovery procedure, Sep. 21, 2017, 3GPP, 3GPP TSG RAN WG1 Meeting Ad Hoc #3, Tdoc: R1-1715620 (Year: 2017).*

NEC, Discussion on beam failure recovery, Sep. 21, 2017, 3GPP, 3GPP TSG RAN WG1 Meeting NR#03, Tdoc: R1-1715708 (Year: 2017).*

Qualcomm, Summary of Beam Mgmt., Dec. 1, 2017, 3GPP, 3GPP TSG RAN WG1 Meeting #91, Tdoc: R1-1721696 (Year: 2017).*

MediaTek Inc., Offline discussion summary on remaining issues on Beam Failure Recovery, Dec. 1, 2017, 3GPP, 3GPP TSG RAN WG1 Meeting #91, Tdoc: R1-1721699 (Year: 2017).*

MediaTek, LS to RAN2 on Beam Failure Recovery, Dec. 1, 2017, 3GPP, 3GPP TSG RAN WG1 Meeting #91, Tdoc: R1-1721700 (Year: 2017).*

Qualcomm Incorporated, Remaining details on QCL., Dec. 1, 2017, 3GPP, 3GPP TSG RAN WG1 Meeting #91, Tdoc: R1-1720672 (Year: 2017).*

* cited by examiner

BEAM INDICATION CONSIDERING BEAM FAILURE RECOVERY IN NEW RADIO

RELATED APPLICATIONS

The present application claims priority to PCT Patent Application No. PCT/CN2018/072385, filed Jan. 12, 2018, and PCT Patent Application No. PCT/CN2018/072452, filed Jan. 12, 2018, the entire applications of each of which are hereby incorporated by reference in their entireties for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
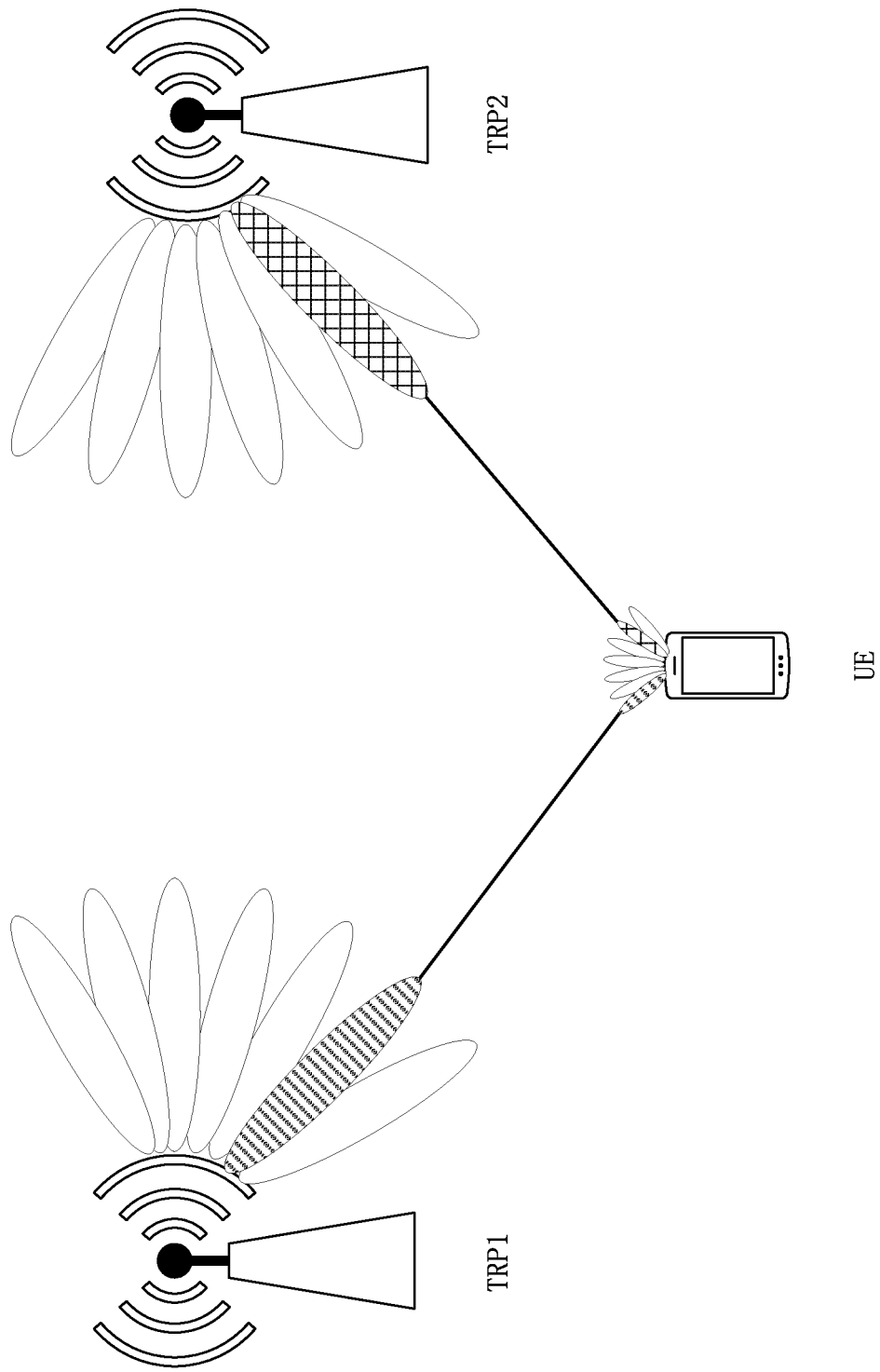
FIG. 1 illustrates an example of a simultaneous transmission using multiple Transmission/Reception (Tx/Rx) beams, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's highly sophisticated integrated communication platform. The next generation wireless communication system, 5G, or new radio (NR) will provide access to information and sharing of data anywhere, and anytime by various users and applications. NR is expected to be a unified network/system that targets to meet vastly different and sometime conflicting performance dimensions and services. Such diverse multi-dimensional designs are driven by different services and applications. In general, NR will evolve based on 3GPP LTE-Advanced with additional potential new Radio Access Technologies (RATs) to enrich people lives with better, simple and seamless wireless connectivity solutions. NR will enable everything to be connected by wireless systems and deliver fast, rich contents and services.

For 5G systems, high frequency band communication has attracted significant attention from the industry, due to the fact that it can provide wider bandwidth to support future integrated communication systems. Accordingly, beamforming is a critical technology for the implementation of high frequency band systems due to the fact that the beamforming gain can compensate for severe path loss caused by atmospheric attenuation, improve the signal to noise ratio (SNR), and enlarge the coverage area. By aligning the transmission beam to the target UE, the radiated energy is focused for higher energy efficiency, and the mutual UE interference is suppressed.

FIG. 1 illustrates an example of a simultaneous transmission using multiple Transmission/Reception (Tx/Rx) beams. FIG. 1 further illustrates one example of simultaneous transmission using Tx and Rx beams. In the example, the UE is equipped with two or multiple antenna sub-arrays, also referred to as antenna panels. Each antenna sub-array can be used to transmit and receive a signal in a directed beam with a transmission-reception point (TRP). A TRP is synonymous with a base station (BS) or next generation node B (gNB). The use of multiple sub-arrays or panels allows simultaneous transmission and reception using multiple beams to be supported at a UE.

When there are multiple transmitting antennas, the phase between different antennas can be discontinuous. Hence, it may be difficult to employ an antenna combination based scheme. Accordingly, an antenna selection based transmission scheme can be considered for the transmission of physical uplink control channel (PUCCH). As mentioned above, the UE may be equipped with multiple panel type antennas. In this case, certain mechanisms can be defined to select the antenna panel(s) that are used to transmit the PUCCH.

Timing for PDSCH QCL Assumption Considering Beam Failure Recovery

Figure 2:
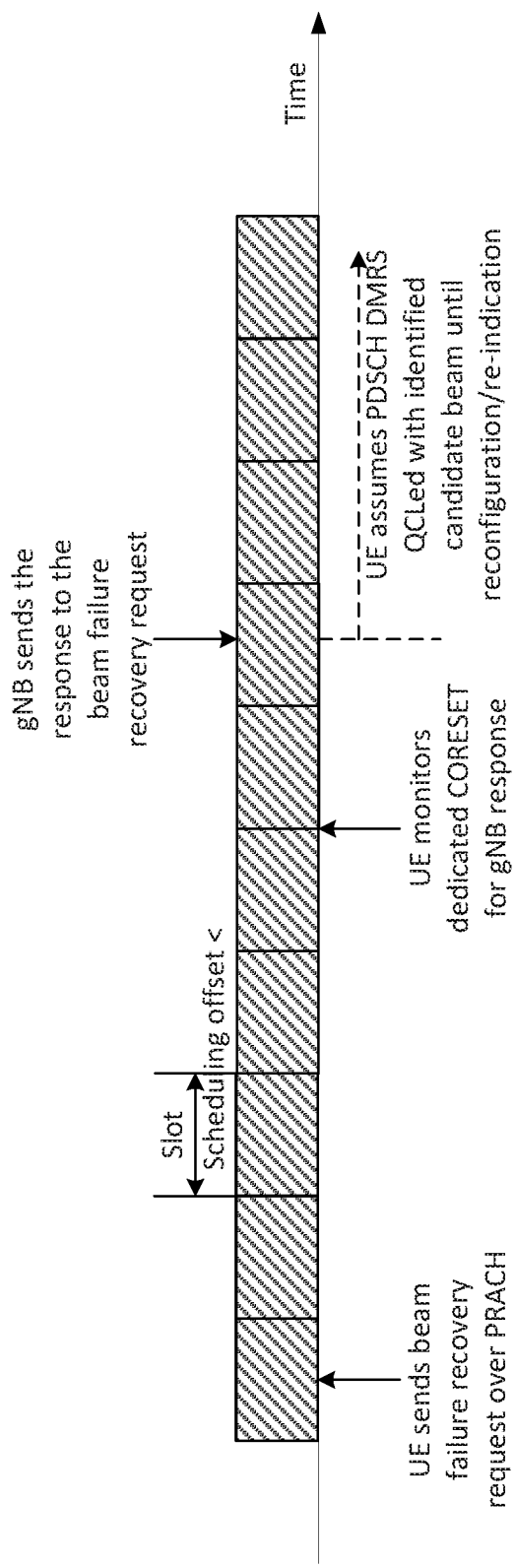
FIG. 2 illustrates an example of physical downlink shared channel (PDSCH) quasi co-located (QCL) assumption in beam failure recovery, in accordance with an example.

FIG. 2 illustrates an example of an existing scheme for physical downlink shared channel (PDSCH) quasi co-located (QCL) assumption in beam failure recovery. In one example, upon receiving a next generation Node B (gNB) response for a beam failure recovery request, the UE can assume that the PDSCH demodulation reference signal (DMRS) is spatially QCLed with the downlink (DL) reference signal (RS) of the UE identified candidate beam until the reconfiguration/activation/re-indication of the transmission configuration indicator (TCI) state for PDCCH.

Figure 3:
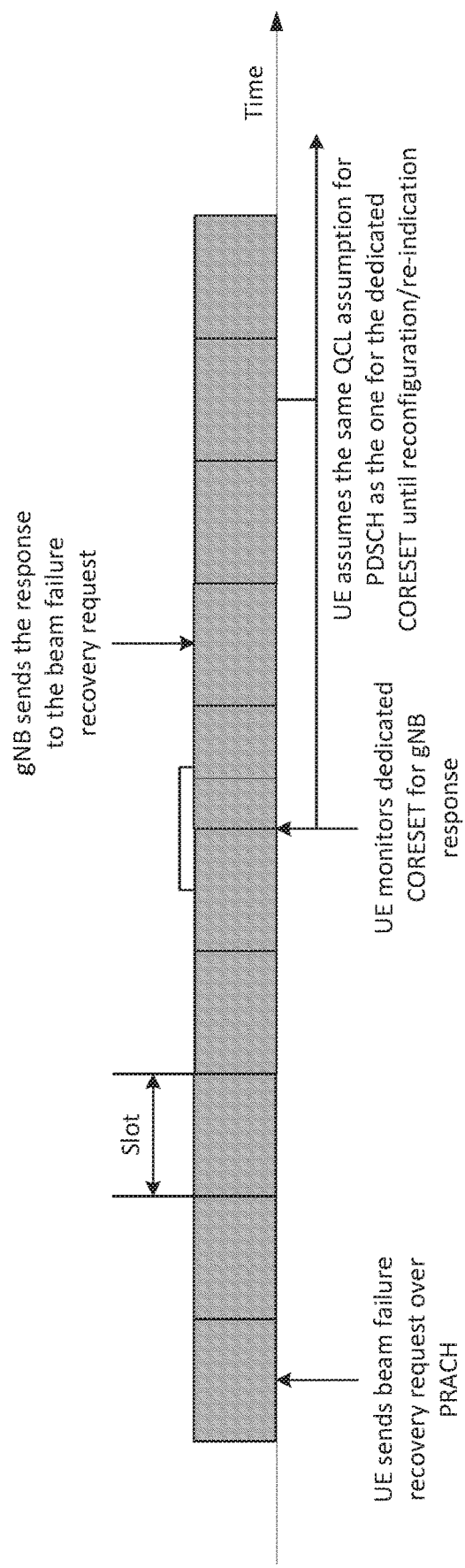
FIG. 3 illustrates an example of proposed timing for PDSCH QCL assumption, in accordance with an example.

In one embodiment, due to latency of the downlink control information (DCI) decoding and UE beam switching, there can be examples of beam failure recovery. In one example, only after successfully decoding the DCI, the UE can be configured to determine whether there is a gNB response directed to the UE. Therefore, the UE can apply a default beam for PDSCH reception after the UE monitors the dedicated physical downlink control channel (PDCCH) control resource set (CORESET) for gNB response. FIG. 3 shows an example of the scheme.

FIG. 3 illustrates an example of a proposed timing for PDSCH QCL assumption based on the above described embodiments. In one embodiment, after the UE begins to monitor the dedicated PDCCH CORESET for the gNB response to the beam failure recovery request, the UE can assume that the same QCL assumption for PDSCH is used as the QCL assumption for the dedicated PDCCH CORESET, until the indication of a reconfiguration, activation, or re-indication of a TCI state for the PDCCH.

In one embodiment, after the UE begins to monitor the dedicated PDCCH CORESET for the gNB response to the beam failure recovery request, the UE can assume that the same QCL assumption for PDSCH is used as the QCL assumption for the dedicated PDCCH CORESET, after the UE begins to monitor the dedicated PDCCH CORESET for the gNB response to the beam failure recovery request. In this instance, the UE can assume that the PDSCH DMRS is spatially QCLed with the DL RS of the UE identified candidate beam until an indication of the reconfiguration/activation/re-indication of the TCI state for the physical downlink control channel (PDCCH).

Figure 4:
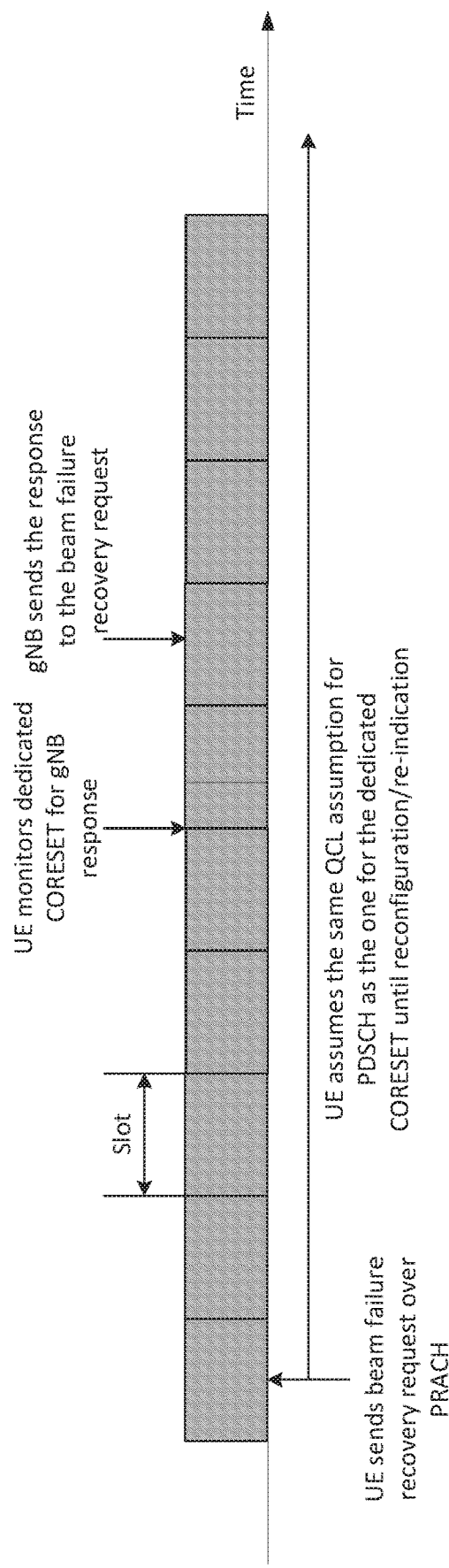
FIG. 4 illustrates another example of proposed timing for PDSCH QCL assumption, in accordance with an example.

Alternatively, the UE can assume that the PDSCH QCL assumption is the same with the PDCCH dedicated CORESET immediately after the UE sends the beam failure recovery request, as depicted in FIG. 4. FIG. 4 illustrates another example of proposed timing for the PDSCH QCL assumption.

In one embodiment, after the UE sends a beam failure recovery request over the physical random access channel (PRACH) or physical uplink control channel (PUCCH), the UE can assume the same QCL assumption for the physical downlink shared channel (PDSCH) is used as the QCL assumption for the dedicated PDCCH CORESET until an indication or determining of a reconfiguration/activation/re-indication of the TCI state for PDCCH.

In one embodiment, the UE can assume that the same QCL assumption for the PDSCH us used as the QCL assumption for the dedicated PDCCH CORESET after the UE sends a beam failure recovery request over PRACH or PUCCH. In one example, the UE can assume the PDSCH DMRS is spatially QCLed with the DL RS of the UE identified candidate beam until the reconfiguration/activation/re-indication of the TCI state for PDCCH.

Default Beam for PDSCH Considering Beam Failure Recovery

Figure 5:
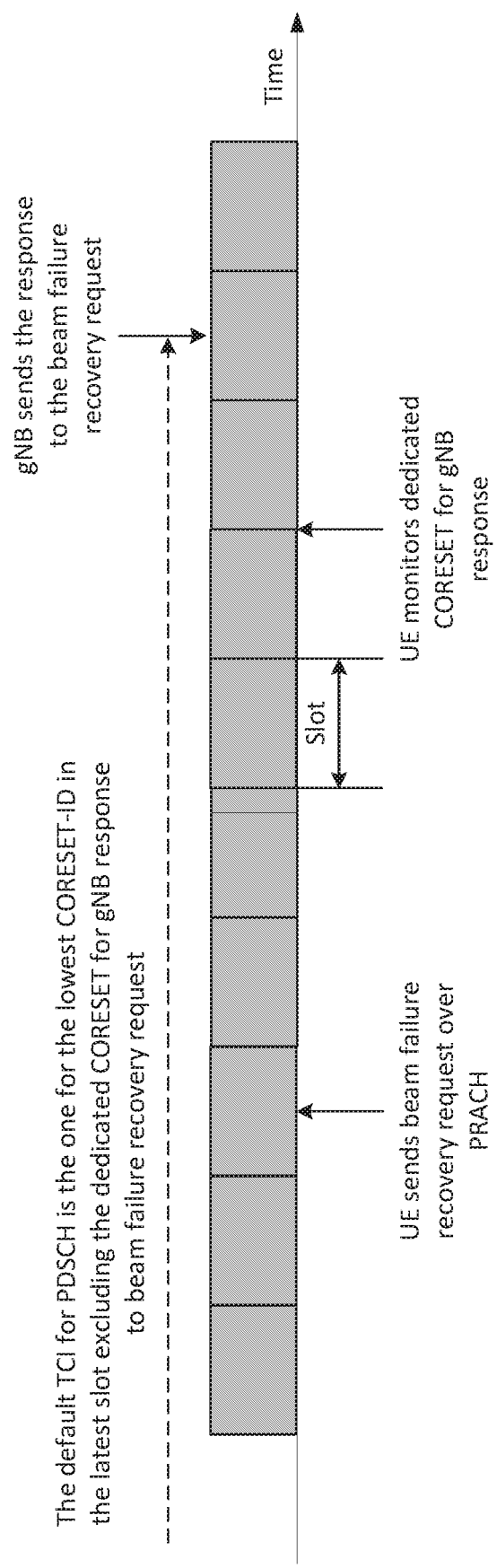
FIG. 5 illustrates an example of a default beam operation considering beam failure, in accordance with an example.

FIG. 5 illustrates an example of a default beam operation considering beam failure. In one example, a scheduling offset between the PDCCH and the PDSCH is smaller than a certain threshold, k, where k is a real number. The UE can assume a default TCI state for the PDSCH reception is the TCI state used for the PDCCH QCL indication of the lowest CORESET identification (CORESET-ID) in the latest slot in which one or more CORESETs are configured for the UE. In one example, when determining the default PDSCH beam, the PDCCH CORESET can be the unicast CORESET. As such, in some embodiments, the broadcast CORESETs can be excluded.

Figure 6A:
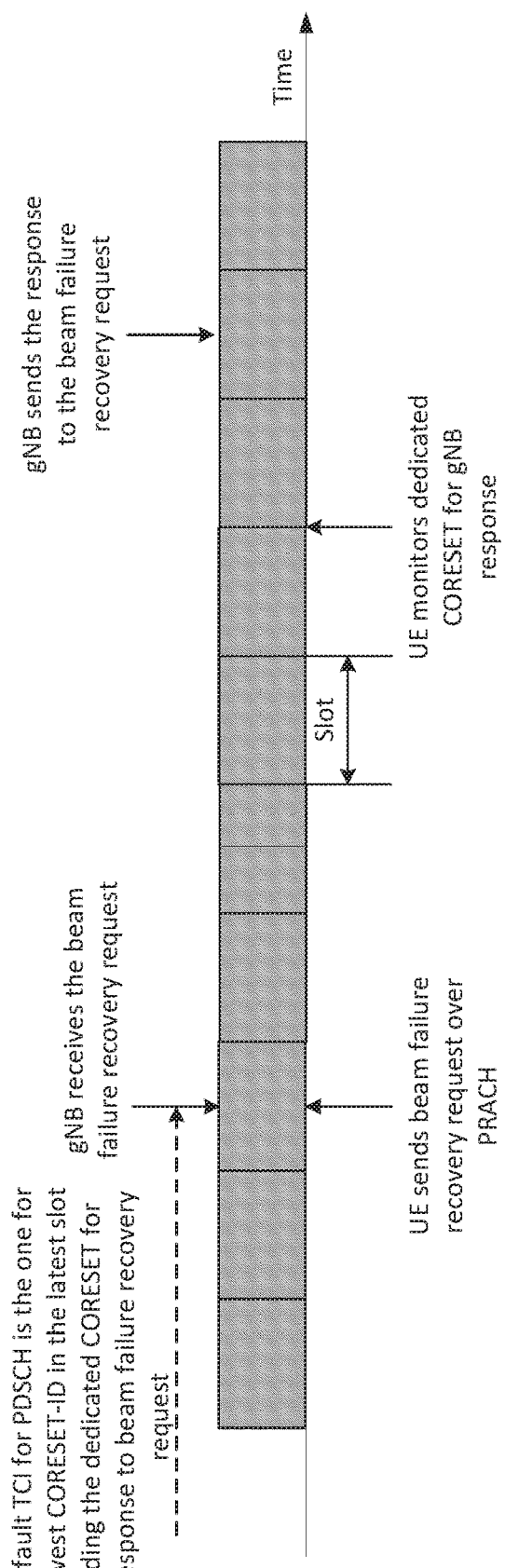
FIG. 6(a) illustrates another example of a default beam operation considering beam failure, in accordance with an example.
Figure 6B:
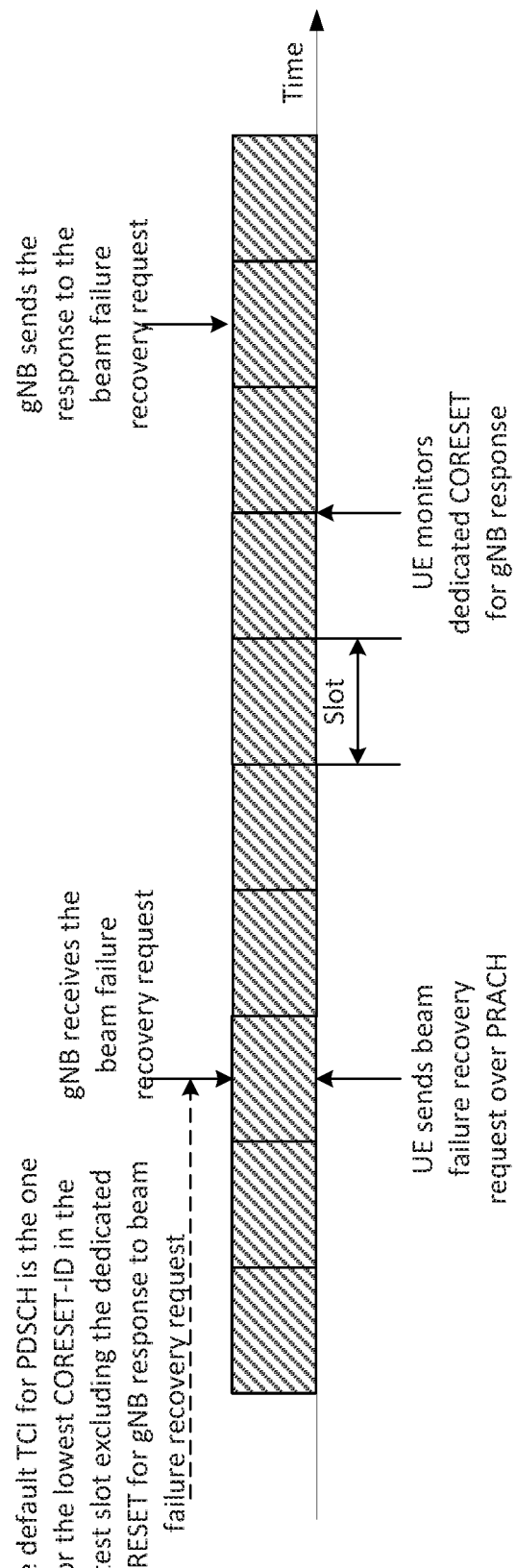
FIG. 6(b) illustrates another example of a default beam indication considering beam failure, in accordance with an example.

In one embodiment, in considering the beam failure recovery operation, the UE can monitor a dedicated PDCCH CORESET for a gNB response after sending the beam failure recovery request as shown in previously discussed FIG. 2. Thus, the dedicated CORESET can be excluded when determining the default beam for PDSCH, before the gNB sends the response, or before the gNB receives the beam failure recovery request. Examples of this operation are further displayed and indicated in FIG. 6(a) and FIG. 6(b).

In an embodiment, if the scheduling offset between the PDCCH and the PDSCH is smaller than a certain threshold, that can be predetermined, before the gNB sends a response to beam failure recovery request, or before the gNB receives the beam failure recovery request, the UE can assume a default TCI state for PDSCH reception. The default TCI state can be the TCI state used for the PDCCH QCL indication of the lowest CORESET-ID in the latest slot in which one or more CORESETs are configured for the UE. The lowest CORESET-ID can be determined excluding the dedicated CORESET for the gNB response to the beam failure recovery request.

In one embodiment, if the scheduling offset between PDCCH and PDSCH is smaller than a certain threshold before the gNB sends a response to the beam failure recovery request, or before the gNB receives the beam failure recovery request, then the UE can assume a default TCI state for PDSCH reception. The default TCI state is the TCI state used for the PDCCH QCL indication of the lowest unicast CORESET-ID (or the CORESET for unicast PDSCH) in the latest slot in which one or more unicast CORESETs (or the CORESET for unicast PDSCH), which exclude the CORESET used for the gNB response to the beam failure recovery request, are configured for the UE. In some examples, this can occur when determining the default beam for PDSCH reception. Further, the broadcast PDCCH CORESETs can be excluded, such as the CORESETs for remaining minimum system information (RMSI)/other system information (OSI)/Paging. Additionally, the dedicated CORESET for gNB response to the beam failure recovery request can be also excluded.

In one embodiment, the UE can be configured for the following CORESET monitoring operations after sending the beam failure recovery request, or after 4 slots from the slot of the beam failure recovery request transmission. In one example, the UE can monitor only the CORESET for the gNB response to the beam failure recovery request. In one example, the UE can monitor both the CORESET for the gNB response to the beam failure recovery request and the broadcast CORESETs, such as the CORESETs for RMSI/OSI/Paging. In one example, the UE can monitor all the configured CORESETs, including the CORESET for the gNB response to the beam failure recovery request, and the broadcast CORESETs, such as the CORESETs for RMSI/OSI/Paging, and the previously configured unicast PDCCH CORESET(s).

In an embodiment, the UE can be configured to monitor only the CORESET for the gNB response to beam failure recovery request after sending the beam failure recovery request, or after 4 slots from the slot of beam failure recovery request transmission. Additionally, the default beam for the PDSCH reception can be the same as the beam used for the dedicated CORESET for the gNB response. If the UE is configured to monitor both the CORESET for the gNB response and the broadcast CORESETS, the default PDSCH beam can be configured to be the same as the beam used for the CORESET which delivers the DCI. If the UE is configured to monitor all of the CORESETs, the default PDSCH beam can be configured to be the beam used for the dedicated CORESET for gNB response or the default beam is the same as the beam used for the CORESET which delivers the DCI.

In one embodiment, after the UE sends the beam failure recovery request, if the UE receives DCI on the CORESET(s), except the dedicated CORESET for the gNB response, the UE can treat the received DCI as a notification that the link has been recovered. The UE can stop re-sending the following beam failure recovery requests if the UE does not receive the gNB response within a configured time window. The UE can then perform beam reporting and the gNB can refresh the TCI table for beam indication. If the UE receives a gNB response within a configured time window, the UE can follow the gNB response for the next procedures.

In one embodiment, the number of PT-RS antenna ports can be configured per TCI state, if the TCI is not present in the PDCCH, or the scheduling offset is below a threshold with the TCI present. In accordance, the number of phase tracking reference signal (PT-RS) antenna ports should always be 1 if PT-RS is configured. Further, the number of PT-RS antenna ports can be configured to not include the DCI in the dedicated CORESET for the beam failure recovery response. Additionally, the number of PT-RS antenna ports can be fixed, e.g. 1 or configured by higher layer signaling, before the reconfiguration/re-indication/activation of the CORESET.

Uplink Beam Indication

For PUCCH, a list of the spatial relations between the RS and the PUCCH is configured by the radio resource control (RRC) layer. Each entry of the list can be a synchronization signal block identification (SSB ID), or channel state information reference signal (CSI-RS) resource indicator CRI or spatial relation information (SRI). One or multiple Spatial-RelationInfo information element (IE) is included in the list. A medium access control (MAC) control element (MAC-CE) can be used to provide spatial relation information for a PUCCH resource to one of the entries in the list. If the list includes only one SpatialRelationInfo IE, the UE applies the configured SpatialRelationInfo, where a MAC-CE is used.

In one embodiment, the RRC signal can be used to explicitly differentiate between SRS resource sets for beam management and SRS resource set for codebook/non-codebook based UL transmission. Thus, the SRS resource set for codebook or non-codebook based UL transmissions, can be configured for a similar beam indication to be introduced. In this case, the RRC signal can be used to configure the list of spatial relation between reference RS and SRS, and MAC-CE is used to activate one spatial relation information for one SRS resource.

In an embodiment, for the SRS resource set for codebook/non-codebook based UL transmission, a list of the spatial relation between the reference RS and SRS is configured by the RRC. Each entry of the list can be a SSB ID, or CRI or SRI. Additionally, one or multiple SpatialRelationInfo IE is included in the list. The MAC-CE can be configured to provide spatial relation information for an SRS resource to one of the entries in the list. If the list includes only one SpatialRelationInfo IE, the UE can apply the configured SpatialRelationInfo and the MAC-CE can be excluded from the configuration. The RRC can be used to maintain a plurality of uplink transfer (Tx) beams, wherein the UL Tx beams can be one of multiple SSB ID, CRI or SRI. Additionally, the MAC CE can be used to select N, where N>=1 Tx beams configured by RRC. As such, the beam indication can be configured per SRS resource, per SRS resource set, or per SRS antenna port.

Figure 7:
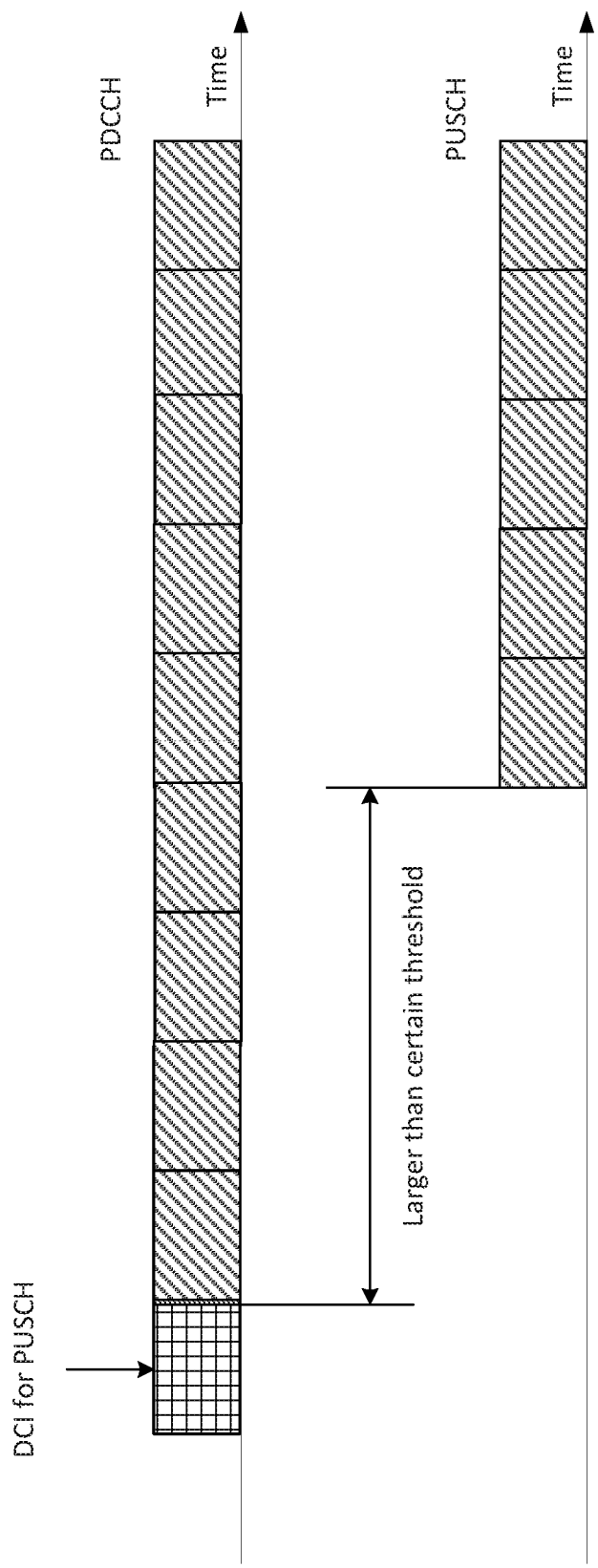
FIG. 7 illustrates an example of the PUSCH beam indication, in accordance with an example.

In one embodiment, the PUSCH beam indication is delivered over the DCI. In instances where there is a delay of DCI decoding and UE beam switching, the time offset between the DCI and the application of the new Tx beam for PUSCH should be larger than a certain threshold. The threshold is determined by the DCI decoding delay and the UE beam switching delay and can be configured according to the UE capability. FIG. 7 illustrates an example of the operation through the use of a PUSCH beam indication.

In one example, if the SRI is not included in the DCI or no SRS resource for codebook based or non-codebook based transmission is configured, the PUSCH beam indication can be based on the RRC and/or the MAC CE.

In one embodiment, the UE can report the capability for the delay of the DCI decoding and the UE Tx beam switching, and indicate the capability as a threshold, k. In one example, when the gNB sends a beam indication for PUSCH over the DCI, the time offset between the DCI and application of the new Tx beam for PUSCH can be larger than or equal to the threshold k.

Figure 8:
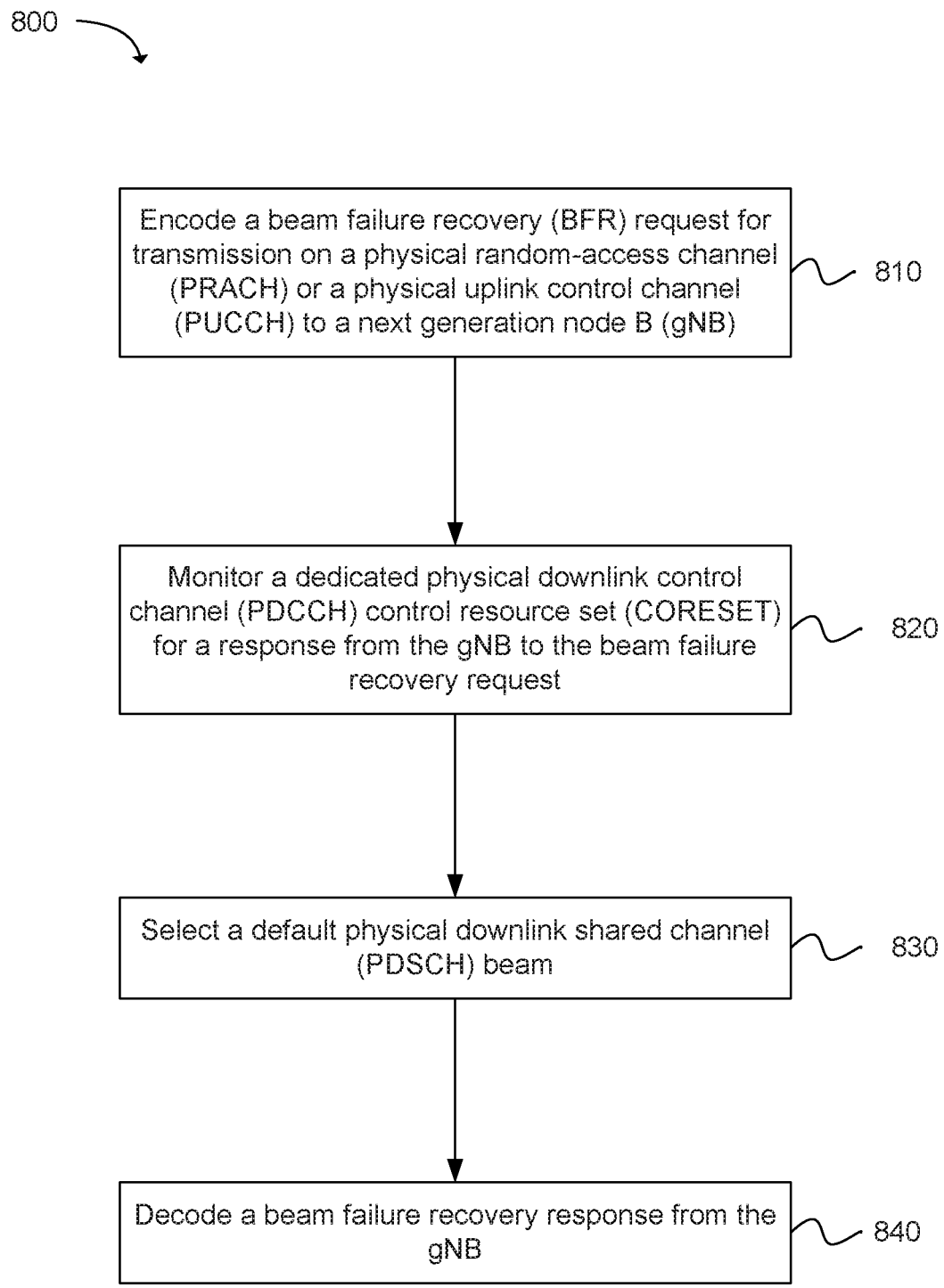
FIG. 8 depicts functionality of a user equipment (UE) configured to perform beam failure recovery, in accordance with an example.

FIG. 8 depicts functionality 800 of a user equipment (UE) configured to perform beam failure recovery. The UE can comprise of one or more processors configured to encode a beam failure recovery (BFR) request for transmission on a physical random-access channel (PRACH) or a physical uplink control channel (PUCCH) to a next generation node B (gNB) 810. The UE can comprise of one or more processors configured to monitor a dedicated physical downlink control channel (PDCCH) control resource set (CORESET) for a response from the gNB to the beam failure recovery request 820. The UE can comprise of one or more processors configured to select a default physical downlink shared channel (PDSCH) beam, wherein it is assumed a same quasi co-location (QCL) assumption for a PDSCH as a QCL assumption for the dedicated PDCCH CORESET; a PDSCH demodulation reference signal (DMRS) is QCLed with a downlink (DL) reference signal (RS) of an identified candidate beam by the UE 830. The UE can comprise of one or more processors configured to decode a beam failure recovery response from the gNB 840.

In one embodiment, the one or more processors are further configured to assume the same QCL assumption for the PDSCH as the QCL assumption for the dedicated PDCCH CORESET after the UE starts to monitor the dedicated PDCCH CORESET for a response from the gNB to the beam failure recovery request.

In one embodiment, the one or more processors are further configured to assume the same QCL assumption for the PDSCH as the QCL assumption for the dedicated PDCCH CORESET after the UE transmits the beam failure recovery request.

In one embodiment, the one or more processors are further configured to assume the same QCL assumption for the PDSCH until a reconfiguration, or activation, or re-indication of a transmission configuration indicator (TCI) state for the PDCCH.

In one embodiment, the one or more processors are further configured to monitor a plurality of PDCCH CORE-SETs after transmitting the beam failure recovery request wherein monitoring comprises monitor only the dedicated PDCCH CORESET for the gNB response to the beam failure recovery request, wherein a default PDSCH beam is a same beam used for the dedicated PDCCH CORESET for the gNB response. The one or more processors can further be configured to monitor a plurality of PDCCH CORESETs after transmitting the beam failure recovery request wherein monitoring comprises monitor, for a remaining minimum system information (RMSI), other system information (OSI), or paging, both the dedicated PDCCH CORESET for the gNB response to the beam failure recovery request and one or more broadcast CORESETs, wherein the default PDSCH beam is a same beam used for a CORESET that includes downlink control information (DCI). The one or more processors can further be configured to monitor a plurality of PDCCH CORESETs after transmitting the beam failure recovery request wherein monitoring comprises monitor all configured CORESETs including the dedicated PDCCH CORESET for gNB response to beam failure recovery request, one or more broadcast CORESETs, and one or more previously configured unicast PDCCH CORE-SETs, wherein the default PDSCH beam is a PDCCH beam used for the dedicated PDCCH CORESET for the gNB response or the default PDSCH beam is the PDCCH beam used for the PDCCH CORSET that includes the DCI.

In one embodiment, the one or more processors are further configured to decode the DCI received on the PDCCH CORESET after the UE transmits the beam failure recovery request; determine that a link has been recovered based on the decoded DCI; cease re-sending a beam failure recovery request; and perform beam reporting to enable the gNB to refresh a transmission configuration indicator (TCI) table for beam indication.

In one embodiment, the one or more processors are further configured to monitor a plurality of PDCCH CORE-SETs; and determine a lowest CORESET identification (ID) by excluding a dedicated PDCCH CORESET used for sending the response to the BFR from the gNB to the UE from the plurality of PDCCH CORESETs.

Figure 9:
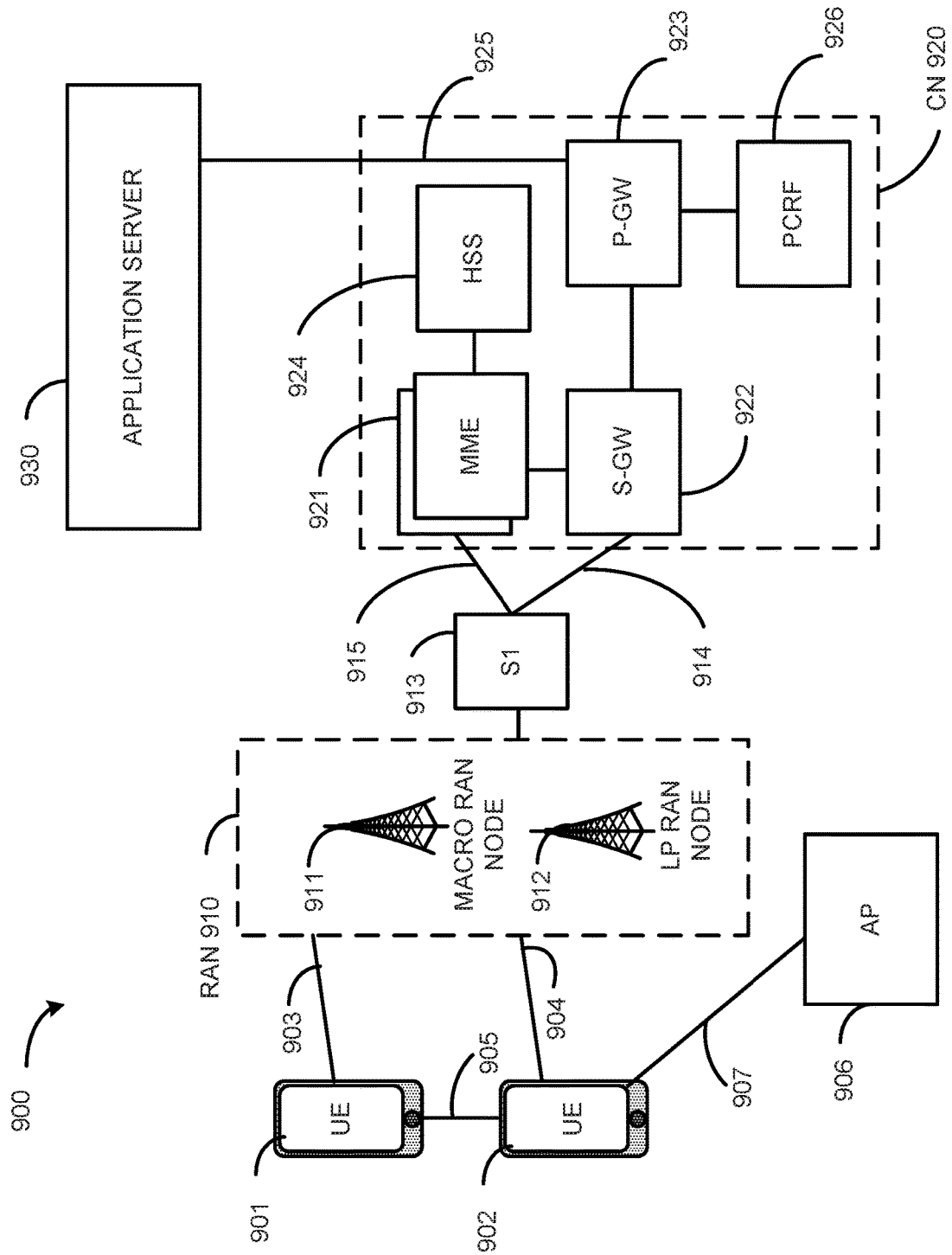
FIG. 9 illustrates an architecture of a network in accordance with an example.

FIG. 9 illustrates architecture of a system 900 of a network in accordance with some embodiments. The system 900 is shown to include a user equipment (UE) 901 and a UE 902. The UEs 901 and 902 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 901 and 902 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 and 902 may be configured to connect, e.g., communicatively couple, with a radio access network (RAN) 910—the RAN 910 may be, for example, an Evolved Universal Mobile Telecommunications System (UMTS) Terrestrial Radio Access Network (E-UTRAN), a Ne8Gen RAN (NG RAN), or some other type of RAN. The UEs 901 and 902 utilize connections 903 and 904, respectively, each of which comprises a physical communications interface or layer (discussed in further detail below); in this example, the connections 903 and 904 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 901 and 902 may further directly exchange communication data via a ProSe interface 905. The ProSe interface 905 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 902 is shown to be configured to access an access point (AP) 906 via connection 907. The connection 907 can comprise a local wireless connection, such as a connection consistent with any IEEE 802.11 protocol, wherein the AP 906 would comprise a wireless fidelity (WiFi®) router. In this example, the AP 906 is shown to be connected to the Internet without connecting to the core network of the wireless system (described in further detail below).

The RAN 910 can include one or more access nodes that enable the connections 903 and 904. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 910 may include one or more RAN nodes for providing macrocells, e.g., macro RAN node 911, and one or more RAN nodes for providing femtocells or picocells (e.g., cells having smaller coverage areas, smaller user capacity, or higher bandwidth compared to macrocells), e.g., low power (LP) RAN node 912.

Any of the RAN nodes 911 and 912 can terminate the air interface protocol and can be the first point of contact for the UEs 901 and 902. In some embodiments, any of the RAN nodes 911 and 912 can fulfill various logical functions for the RAN 910 including, but not limited to, radio network controller (RNC) functions such as radio bearer management, uplink and downlink dynamic radio resource management and data packet scheduling, and mobility management.

In accordance with some embodiments, the UEs 901 and 902 can be configured to communicate using Orthogonal Frequency-Division Multiplexing (OFDM) communication signals with each other or with any of the RAN nodes 911 and 912 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 911 and 912 to the UEs 901 and 902, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 901 and 902. The physical downlink control channel (PDCCH) may carry information about the transport format and resource allocations related to the PDSCH channel, among other things. It may also inform the UEs 901 and 902 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 911 and 912 based on channel quality information fed back from any of the UEs 901 and 902. The downlink resource assignment information may be sent on the PDCCH used for (e.g., assigned to) each of the UEs 901 and 902.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 910 is shown to be communicatively coupled to a core network (CN) 920—via an S1 interface 913. In embodiments, the CN 920 may be an evolved packet core (EPC) network, a Next Gen Packet Core (NPC) network, or some other type of CN. In this embodiment the S1 interface 913 is split into two parts: the S1-U interface 914, which carries traffic data between the RAN nodes 911 and 912 and the serving gateway (S-GW) 922, and the S1-mobility management entity (MME) interface 915, which is a signaling interface between the RAN nodes 911 and 912 and MMEs 921.

In this embodiment, the CN 920 comprises the MMEs 921, the S-GW 922, the Packet Data Network (PDN) Gateway (P-GW) 923, and a home subscriber server (HSS) 924. The MMEs 921 may be similar in function to the control plane of legacy Serving General Packet Radio Service (GPRS) Support Nodes (SGSN). The MMEs 921 may manage mobility aspects in access such as gateway selection and tracking area list management. The HSS 924 may comprise a database for network users, including subscription-related information to support the network entities' handling of communication sessions. The CN 920 may comprise one or several HSSs 924, depending on the number of mobile subscribers, on the capacity of the equipment, on the organization of the network, etc. For example, the HSS 924 can provide support for routing/roaming, authentication, authorization, naming/addressing resolution, location dependencies, etc.

The S-GW 922 may terminate the S1 interface 913 towards the RAN 910, and routes data packets between the RAN 910 and the CN 920. In addition, the S-GW 922 may be a local mobility anchor point for inter-RAN node handovers and also may provide an anchor for inter-3GPP mobility. Other responsibilities may include lawful intercept, charging, and some policy enforcement.

The P-GW 923 may terminate an SGi interface toward a PDN. The P-GW 923 may route data packets between the EPC network 923 and external networks such as a network including the application server 930 (alternatively referred to as application function (AF)) via an Internet Protocol (IP) interface 925. Generally, the application server 930 may be an element offering applications that use IP bearer resources with the core network (e.g., UMTS Packet Services (PS) domain, LTE PS data services, etc.). In this embodiment, the P-GW 923 is shown to be communicatively coupled to an application server 930 via an IP communications interface 925. The application server 930 can also be configured to support one or more communication services (e.g., Voice-over-Internet Protocol (VoIP) sessions, PTT sessions, group communication sessions, social networking services, etc.) for the UEs 901 and 902 via the CN 920.

The P-GW 923 may further be a node for policy enforcement and charging data collection. Policy and Charging Enforcement Function (PCRF) 926 is the policy and charging control element of the CN 920. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 926 may be communicatively coupled to the application server 930 via the P-GW 923. The application server 930 may signal the PCRF 926 to indicate a new service flow and select the appropriate Quality of Service (QoS) and charging parameters. The PCRF 926 may provision this rule into a Policy and Charging Enforcement Function (PCEF) (not shown) with the appropriate traffic flow template (TFT) and QoS class of identifier (QCI), which commences the QoS and charging as specified by the application server 930.

Figure 10:
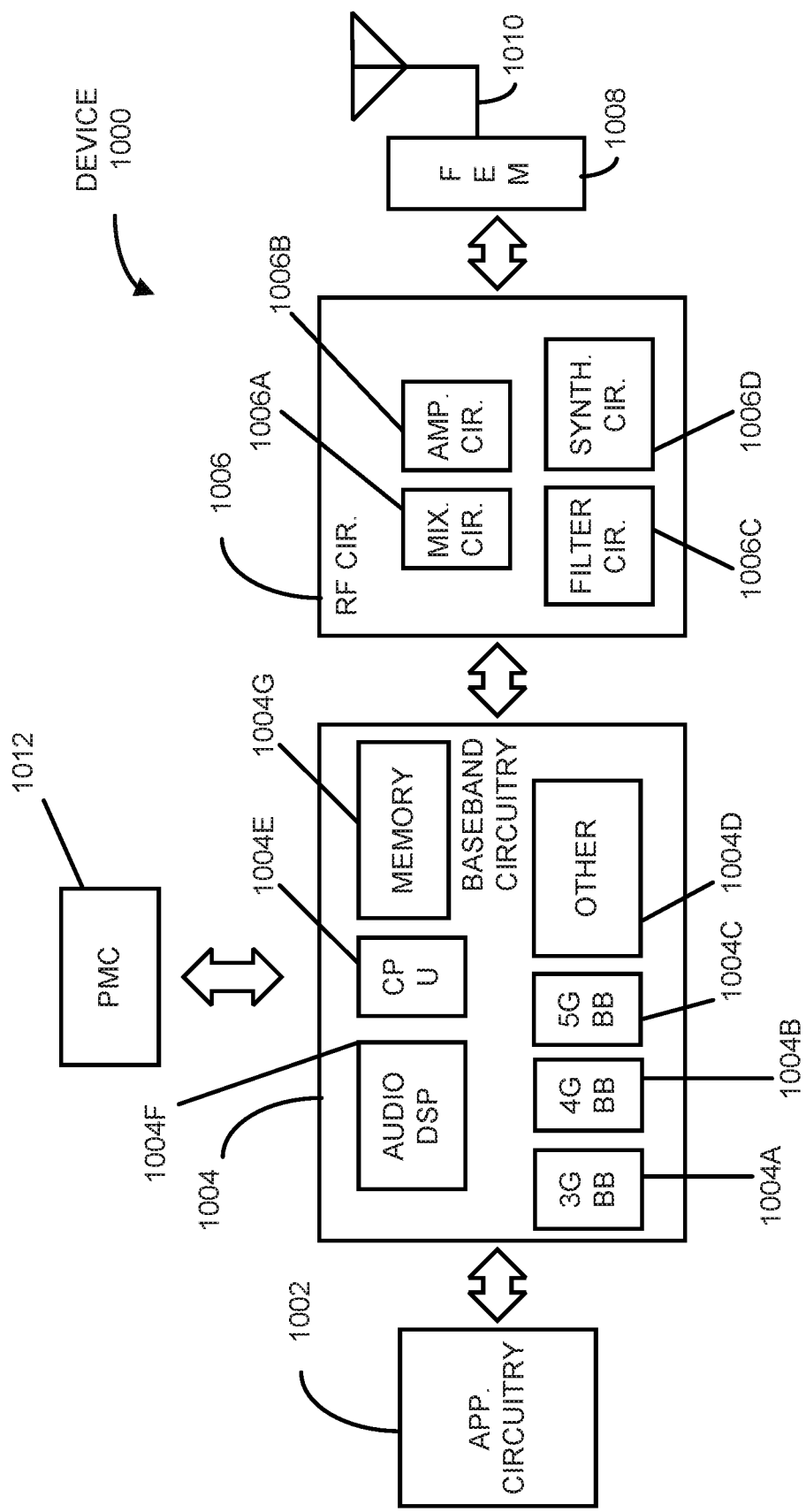
FIG. 10 illustrates a diagram of a wireless device (e.g., UE) and a base station (e.g., eNodeB) in accordance with an example.

FIG. 10 illustrates example components of a device 1000 in accordance with some embodiments. In some embodiments, the device 1000 may include application circuitry 1002, baseband circuitry 1004, Radio Frequency (RF) circuitry 1006, front-end module (FEM) circuitry 1008, one or more antennas 1010, and power management circuitry (PMC) 1012 coupled together at least as shown. The components of the illustrated device 1000 may be included in a UE or a RAN node. In some embodiments, the device 1000 may include less elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a third generation (3G) baseband processor 1004A, a fourth generation (4G) baseband processor 1004B, a fifth generation (5G) baseband processor 1004C, or other baseband processor(s) 1004D for other existing generations, generations in development or to be developed in the future (e.g., second generation (2G), sixth generation (6G), etc.). The baseband circuitry 1004 (e.g., one or more of baseband processors 1004A-D) may handle various radio control functions that enable communication with one or more radio networks via the RF circuitry 1006. In other embodiments, some or all of the functionality of baseband processors 1004A-D may be included in modules stored in the memory 1004G and executed via a Central Processing Unit (CPU) 1004E. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include one or more audio digital signal processor(s) (DSP) 1004F. The audio DSP(s) 1004F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the receive signal path of the RF circuitry 1006 may include mixer circuitry 1006a, amplifier circuitry 1006b and filter circuitry 1006c. In some embodiments, the transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from the FEM circuitry 1008 based on the synthesized frequency provided by synthesizer circuitry 1006d. The amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a necessity. In some embodiments, mixer circuitry 1006a of the receive signal path may comprise passive mixers, although the scope of the embodiments is not limited in this respect.

In some embodiments, the mixer circuitry 1006a of the transmit signal path may be configured to up-convert input baseband signals based on the synthesized frequency provided by the synthesizer circuitry 1006d to generate RF output signals for the FEM circuitry 1008. The baseband signals may be provided by the baseband circuitry 1004 and may be filtered by filter circuitry 1006c.

In some embodiments, the mixer circuitry 1006a of the receive signal path and the mixer circuitry 1006a of the transmit signal path may include two or more mixers and may be arranged for quadrature downconversion and upconversion, respectively. In some embodiments, the mixer circuitry 1006a of the receive signal path and the mixer circuitry 1006a of the transmit signal path may include two or more mixers and may be arranged for image rejection (e.g., Hartley image rejection). In some embodiments, the mixer circuitry 1006a of the receive signal path and the mixer circuitry 1006a may be arranged for direct downconversion and direct upconversion, respectively. In some embodiments, the mixer circuitry 1006a of the receive signal path and the mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

The synthesizer circuitry 1006d may be configured to synthesize an output frequency for use by the mixer circuitry 1006a of the RF circuitry 1006 based on a frequency input and a divider control input. In some embodiments, the synthesizer circuitry 1006d may be a fractional N/N+1 synthesizer.

In some embodiments, frequency input may be provided by a voltage controlled oscillator (VCO), although that is not a necessity. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006d of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010. In various embodiments, the amplification through the transmit or receive signal paths may be done solely in the RF circuitry 1006, solely in the FEM 1008, or in both the RF circuitry 1006 and the FEM 1008.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010).

In some embodiments, the PMC 1012 may manage power provided to the baseband circuitry 1004. In particular, the PMC 1012 may control power-source selection, voltage scaling, battery charging, or DC-to-DC conversion. The PMC 1012 may often be included when the device 1000 is capable of being powered by a battery, for example, when the device is included in a UE. The PMC 1012 may increase the power conversion efficiency while providing desirable implementation size and heat dissipation characteristics.

While FIG. 10 shows the PMC 1012 coupled only with the baseband circuitry 1004. However, in other embodiments, the PMC 1012 may be additionally or alternatively coupled with, and perform similar power management operations for, other components such as, but not limited to, application circuitry 1602, RF circuitry 1006, or FEM 1008.

In some embodiments, the PMC 1012 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX) after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used execute Layer 3, Layer 2, or Layer 1 functionality, while processors of the application circuitry 1004 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
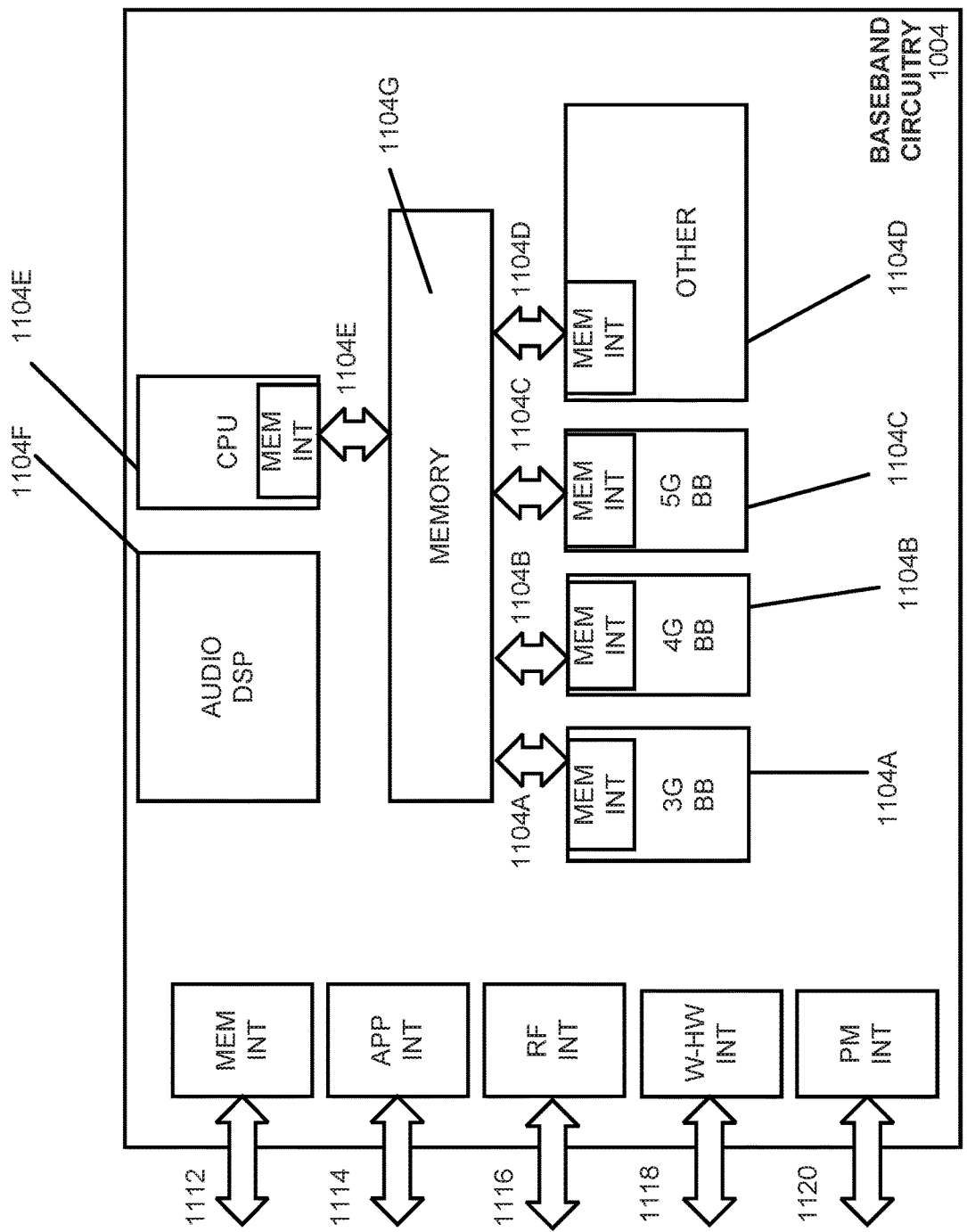
FIG. 11 illustrates example interfaces of baseband circuitry in accordance with an example.

FIG. 11 illustrates example interfaces of baseband circuitry in accordance with some embodiments. As discussed above, the baseband circuitry 1004 of FIG. 10 may comprise processors 1004A-1004E and a memory 1004G utilized by said processors. Each of the processors 1004A-1004E may include a memory interface, 1104A-1104E, respectively, to send/receive data to/from the memory 1004G.

The baseband circuitry 1004 may further include one or more interfaces to communicatively couple to other circuitries/devices, such as a memory interface 1112 (e.g., an interface to send/receive data to/from memory external to the baseband circuitry 1004), an application circuitry interface 1114 (e.g., an interface to send/receive data to/from the application circuitry 1002 of FIG. 10), an RF circuitry interface 1116 (e.g., an interface to send/receive data to/from RF circuitry 1006 of FIG. 10), a wireless hardware connectivity interface 1118 (e.g., an interface to send/receive data to/from Near Field Communication (NFC) components, Bluetooth® components (e.g., Bluetooth® Low Energy), Wi-Fi® components, and other communication components), and a power management interface 1110 (e.g., an interface to send/receive power or control signals to/from the PMC 1012.

Figure 12:
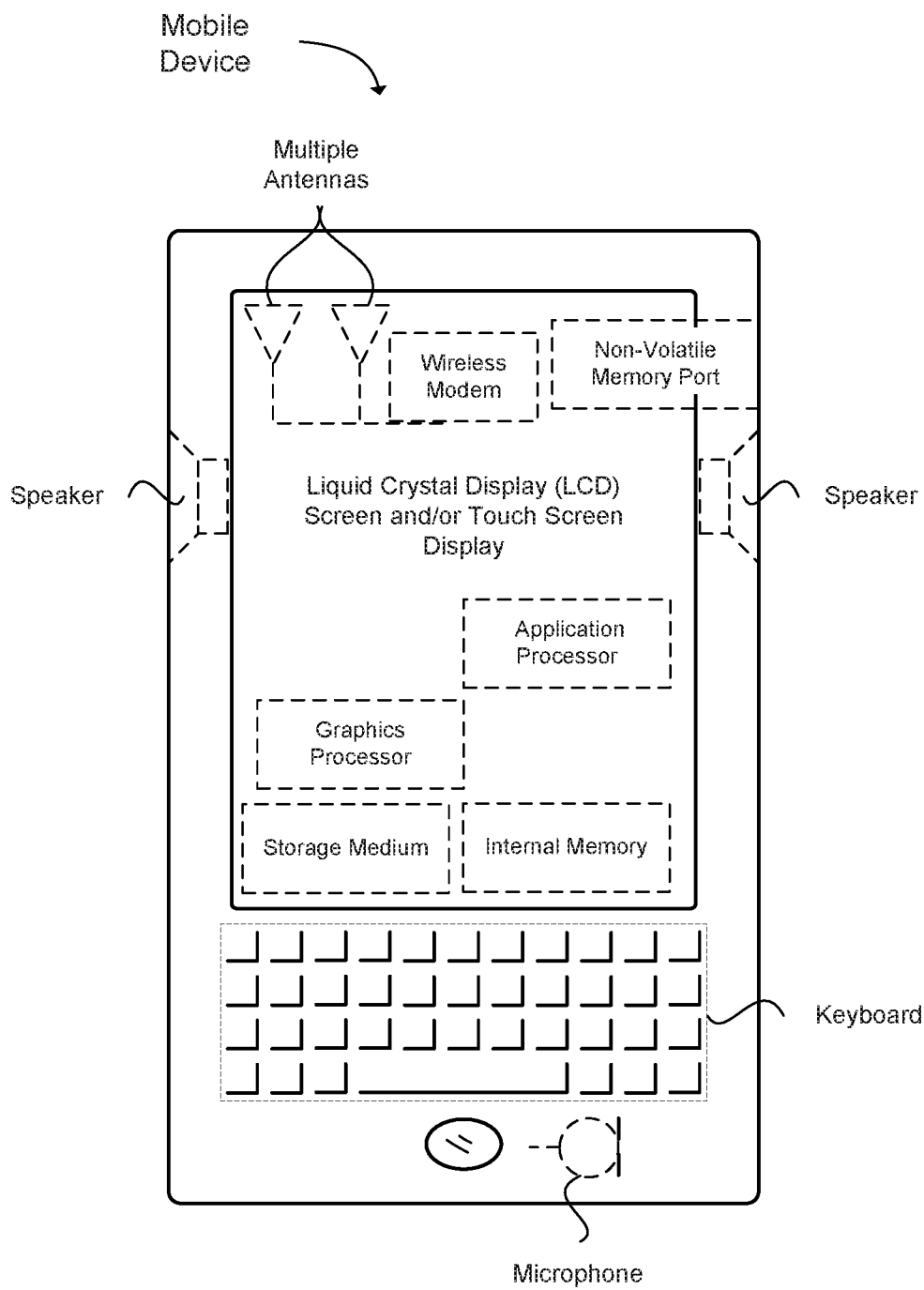
FIG. 12 illustrates a diagram of a wireless device (e.g., UE) in accordance with an example.

FIG. 12 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 12 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) configured to perform beam failure recovery, the apparatus comprising: one or more processors configured to: encode a beam failure recovery (BFR) request for transmission on a physical random-access channel (PRACH) or a physical uplink control channel (PUCCH) to a next generation node B (gNB); monitor a dedicated physical downlink control channel (PDCCH) control resource set (CORESET) for a response from the gNB to the beam failure recovery request; select a default physical downlink shared channel (PDSCH) beam, wherein it is assumed, at the UE that: a same quasi co-location (QCL) assumption for a PDSCH as a QCL assumption for the dedicated PDCCH CORESET; or a PDSCH demodulation reference signal (DMRS) is QCLed with a downlink (DL) reference signal (RS) of an identified candidate beam by the UE; and decode a beam failure recovery request response from the gNB; and a memory interface configured to receive from a memory the QCL assumption.

Example 2 includes the apparatus of example 1, wherein the one or more processors are further configured to assume the same QCL assumption for the PDSCH as the QCL assumption for the dedicated PDCCH CORESET after the UE starts to monitor the dedicated PDCCH CORESET for a response from the gNB to the beam failure recovery request.

Example 3 includes the apparatus of example 1, wherein the one or more processors are further configured to assume the same QCL assumption for the PDSCH as the QCL assumption for the dedicated PDCCH CORESET after the UE transmits the beam failure recovery request.

Example 4 includes the apparatus of example 1, wherein the one or more processors are further configured to assume the same QCL assumption for the PDSCH until a reconfiguration, or activation, or re-indication of a transmission configuration indicator (TCI) state for the PDCCH.

Example 5 includes the apparatus of example 1, wherein the one or more processors are further configured to monitor a plurality of PDCCH CORESETs after transmitting the beam failure recovery request wherein monitoring comprises: monitor only the dedicated PDCCH CORESET for the gNB response to the beam failure recovery request, wherein a default PDSCH beam is a same beam used for the dedicated PDCCH CORESET for the gNB response; monitor, for a remaining minimum system information (RMSI), other system information (OSI), or paging, both the dedicated PDCCH CORESET for the gNB response to the beam failure recovery request and one or more broadcast CORESETs, wherein the default PDSCH beam is a same beam used for a CORESET that includes downlink control information (DCI); monitor all configured CORESETs including the dedicated PDCCH CORESET for gNB response to beam failure recovery request, one or more broadcast CORESETs, and one or more previously configured unicast PDCCH CORESETs, wherein the default PDSCH beam is a PDCCH beam used for the dedicated PDCCH CORESET for the gNB response or the default PDSCH beam is the PDCCH beam used for the PDCCH CORSET that includes the DCI.

Example 6 includes the apparatus of example 5, wherein the one or more processors are further configured to: decode the DCI received on the PDCCH CORESET after the UE transmits the beam failure recovery request; determine that a link has been recovered based on the decoded DCI; cease re-sending a beam failure recovery request; and perform beam reporting to enable the gNB to refresh a transmission configuration indicator (TCI) table for beam indication.

Example 7 includes the apparatus of example 1, wherein the one or more processors are further configured to: monitor a plurality of PDCCH CORESETs; and determine a lowest CORESET identification (ID) by excluding a dedicated PDCCH CORESET used for sending the response to the BFR from the gNB to the UE from the plurality of PDCCH CORESETs.

Example 8 includes an apparatus of a next generation node B (gNB) configured to send a physical downlink control channel (PDCCH) control resource set (CORESET), the apparatus comprising: one or more processors configured to: select a default physical downlink shared channel (PDSCH) beam, prior to receiving a beam failure recovery (BFR) request from a user equipment (UE) or sending a response to the BFR request to the UE, when a scheduling offset between a physical downlink control channel (PDCCH) and a PDSCH is smaller than a selected threshold, k, wherein k is a real number; a memory interface configured to send k to a memory.

Example 9 includes the apparatus of example 8, wherein the one or more processors are further configured to select the default PDSCH beam by excluding: a broadcast PDCCH CORESET, including a CORESET for remaining minimum system information (RMSI), or other system information (OSI), or paging.

Example 10 includes the apparatus of example 8, wherein the one or more processors are further configured to select the default PDSCH beam by excluding: a dedicated PDCCH CORESET used for sending the response to the BFR from the gNB to the UE.

Example 11 includes at least one machine readable storage medium having instructions embodied thereon for a user equipment (UE) configured to perform beam failure recovery, the instructions thereon when executed by one or more processors at the UE perform the following: encode a beam failure recovery (BFR) request for transmission on a physical random-access channel (PRACH) or a physical uplink control channel (PUCCH) to a next generation node B (gNB); monitor a dedicated physical downlink control channel (PDCCH) control resource set (CORESET) for a response from the gNB to the beam failure recovery request; select a default physical downlink shared channel (PDSCH) beam, wherein it is assumed, at the UE that: a same quasi co-location (QCL) assumption for a PDSCH as a QCL assumption for the dedicated PDCCH CORESET; or a PDSCH demodulation reference signal (DMRS) is QCLed with a downlink (DL) reference signal (RS) of an identified candidate beam by the UE; and decode a beam failure recovery request response from the gNB.

Example 12 includes the at least one machine readable storage medium in example 11, further comprising instructions, that when executed by one or more processors at the UE, perform the following: assume the same QCL assumption for the PDSCH as the QCL assumption for the dedicated PDCCH CORESET after the UE starts to monitor the dedicated PDCCH CORESET for a response from the gNB to the beam failure recovery request.

Example 13 includes the at least one machine readable storage medium in example 11, further comprising instructions, that when executed by one or more processors at the UE, perform the following: assume the same QCL assumption for the PDSCH as the QCL assumption for the dedicated PDCCH CORESET after the UE transmits the beam failure recovery request.

Example 14 includes the at least one machine readable storage medium in example 11, further comprising instructions, that when executed by one or more processors at the UE, perform the following: assume the same QCL assumption for the PDSCH until a reconfiguration, or activation, or re-indication of a transmission configuration indicator (TCI) state for the PDCCH.

Example 15 includes the at least one machine readable storage medium in example 11, further comprising instructions, that when executed by one or more processors at the UE, perform the following: monitor a plurality of PDCCH CORESETs after transmitting the beam failure recovery request wherein monitoring comprises: monitor only the dedicated PDCCH CORESET for the gNB response to the beam failure recovery request, wherein a default PDSCH beam is a same beam used for the dedicated PDCCH CORESET for the gNB response; monitor, for a remaining minimum system information (RMSI), other system information (OSI), or paging, both the dedicated PDCCH CORESET for the gNB response to the beam failure recovery request and one or more broadcast CORESETs, wherein the default PDSCH beam is a same beam used for a CORESET that includes downlink control information (DCI); monitor all configured CORESETs including the dedicated PDCCH CORESET for gNB response to beam failure recovery request, one or more broadcast CORESETs, and one or more previously configured unicast PDCCH CORESETs, wherein the default PDSCH beam is a PDCCH beam used for the dedicated PDCCH CORESET for the gNB response or the default PDSCH beam is the PDCCH beam used for the PDCCH CORSET that includes the DCI.

Example 16 includes the at least one machine readable storage medium in example 11, further comprising instructions, that when executed by one or more processors at the UE, perform the following: decode the DCI received on the PDCCH CORESET after the UE transmits the beam failure recovery request; determine that a link has been recovered based on the decoded DCI; cease re-sending a beam failure recovery request; and perform beam reporting to enable the gNB to refresh a transmission configuration indicator (TCI) table for beam indication.

Example 17 includes the at least one machine readable storage medium in example 11, further comprising instructions, that when executed by one or more processors at the UE, perform the following: monitor a plurality of PDCCH CORESETs; and determine a lowest CORESET identification (ID) by excluding a dedicated PDCCH CORESET used for sending the response to the BFR from the gNB to the UE from the plurality of PDCCH CORESETs.

Example 18 includes the at least one machine readable storage medium in example 11, further comprising instructions, that when executed by one or more processors at the UE, perform the following: select the default PDSCH beam when a scheduling offset between the PDCCH and the PDSCH is smaller than a selected threshold, k, wherein k is a real number before the gNB sends response to beam failure recovery request or before the gNB receives the beam failure recovery request.

Example 19 includes the at least one machine readable storage medium in example 11, further comprising instructions, that when executed by one or more processors at the UE, perform the following: select the default PDSCH beam by excluding: a broadcast PDCCH CORESET, including a CORESET for remaining minimum system information (RMSI), or other system information (OSI), or paging.

Example 20 includes the at least one machine readable storage medium in example 11, further comprising instructions, that when executed by one or more processors at the UE, perform the following: select the default PDSCH beam by excluding: a dedicated PDCCH CORESET (CORESET-BFR) for gNB response to the beam failure recovery request.

Example 21 includes the at least one machine readable storage medium in example 11, further comprising instructions, that when executed by one or more processors at the UE, perform the following: monitor the PDCCH CORESET (s) after transmitting the beam failure recovery request wherein monitoring comprises: monitor only the dedicated PDCCH CORESET (CORESET-BFR) for the gNB response to the beam failure recovery request, wherein a default PDSCH beam is a same beam used for the dedicated PDCCH CORESET (CORESET-BFR) for the gNB response; monitor both the dedicated PDCCH COREST (CORESET-BFR) for the gNB response to the beam failure recovery request and one or more broadcast CORESET(s), including one or more CORESET(s) for a remaining minimum system information (RMSI), other system information (OSI), or paging, wherein the default PDSCH beam is a same beam used for a CORESET that includes downlink control information (DCI); monitor all configured CORESETS including the dedicated PDCCH CORESET (CORESET-BFR) for gNB response to beam failure recovery request, one or more broadcast CORESETs, and one or more previously configured unicast PDCCH CORESETs, wherein the default PDSCH beam is a PDCCH beam used for the dedicated PDCCH CORESET for the gNB response or the default PDSCH beam is the PDCCH beam used for the PDCCH CORSET that includes the DCI.

Example 22 includes the at least one machine readable storage medium in example 21, further comprising instructions, that when executed by one or more processors at the UE, perform the following: decode the DCI received on the PDCCH CORESET after the UE transmits the beam failure recovery request; determine that a link has been recovered based on the decoded DCI; cease re-sending a beam failure recovery request; and perform beam reporting to enable the gNB to refresh a transmission configuration indicator (TCI) table for beam indication.

Example 23 includes at least one machine readable storage medium having instructions embodied thereon for a next generation node B (gNB) configured to send a physical downlink control channel (PDCCH) control resource set (CORESET), the instructions thereon when executed by one or more processors at the gNB perform the following: select a default physical downlink shared channel (PDSCH) beam, prior to receiving a beam failure recovery (BFR) request from a user equipment (UE) or sending a response to the BFR request to the UE, when a scheduling offset between a physical downlink control channel (PDCCH) and a PDSCH is smaller than a selected threshold, k, wherein k is a real number.

Example 24 includes at least one machine readable storage medium in example 23, further comprising instructions, that when executed by one or more processors at the gNB, perform the following: select the default PDSCH beam by excluding: a broadcast PDCCH CORESET, including a CORESET for remaining minimum system information (RMSI), or other system information (OSI), or paging.

Example 25 includes at least one machine readable storage medium in example 23, further comprising instructions, that when executed by one or more processors at the gNB, perform the following: select the default PDSCH beam by excluding: a dedicated PDCCH CORESET used for sending the response to the BFR from the gNB to the UE.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) configured to perform beam failure recovery, the apparatus comprising:
  one or more processors configured to:
    encode a beam failure recovery (BFR) request for transmission on a physical random-access channel (PRACH) or a physical uplink control channel (PUCCH) to a base station;
    monitor a dedicated physical downlink control channel (PDCCH) control resource set (CORESET) for a response from the base station after the UE sends the beam failure recovery request;

identify a candidate beam;
select a default physical downlink shared channel (PDSCH) beam, wherein the UE assumes that:
  a same quasi co-location (QCL) assumption for a PDSCH as a QCL assumption for the dedicated PDCCH CORESET; or
  a PDSCH demodulation reference signal (DMRS) is QCLed with a downlink (DL) reference signal (RS) of the candidate beam by the UE; and
decode a beam failure recovery request response received from the base station;
monitor a plurality of PDCCH CORESETs after transmitting the beam failure recovery request, wherein to monitor the plurality of PDCCH CORESETs comprises:
  to monitor only the dedicated PDCCH CORESET for the base station response to the beam failure recovery request, and wherein the default PDSCH beam is a same beam used for the dedicated PDCCH CORESET for the base station response; and
  to monitor, for a remaining minimum system information (RMSI) or other system information (OSI) or paging, both the dedicated PDCCH CORESET for the base station response to the beam failure recovery request and one or more broadcast CORESETs, wherein the default PDSCH beam is a same beam used for a CORESET that includes downlink control information (DCI), and
a memory interface configured to receive from a memory the QCL assumption.

2. The apparatus of claim 1, wherein the one or more processors are further configured to assume the same QCL assumption for the PDSCH as the QCL assumption for the dedicated PDCCH CORESET after the UE starts to monitor the dedicated PDCCH CORESET for a response from the base station to the beam failure recovery request.

3. The apparatus of claim 1, wherein the one or more processors are further configured to assume the same QCL assumption for the PDSCH as the QCL assumption for the dedicated PDCCH CORESET after the UE transmits the beam failure recovery request.

4. The apparatus of claim 1, wherein the one or more processors are further configured to assume the same QCL assumption for the PDSCH until at least one of a reconfiguration of a transmission configuration indicator (TCI) state for the PDCCH, an activation of the TCI state for the PDCCH, and a re-indication of the TCI state for the PDCCH.

5. The apparatus of claim 1, wherein to monitor the plurality of PDCCH CORESETs further comprises:
monitor all configured CORESETs including the dedicated PDCCH CORESET for base station response to beam failure recovery request, one or more broadcast CORESETs, and one or more previously configured unicast PDCCH CORESETs, wherein the default PDSCH beam is a PDCCH beam used for the dedicated PDCCH CORESET for the base station response or the default PDSCH beam is the PDCCH beam used for the PDCCH CORSET that includes the DCI.

6. The apparatus of claim 5, wherein the one or more processors are further configured to:
decode the DCI received on the PDCCH CORESET after the UE transmits the beam failure recovery request;
determine that a link has been recovered based on the DCI;
cease re-sending a beam failure recovery request; and
perform beam reporting to enable the base station to refresh a transmission configuration indicator (TCI) table for beam indication.

7. The apparatus of claim 1, wherein the one or more processors are further configured to:
monitor a plurality of PDCCH CORESETs; and
determine a lowest CORESET identification (ID) by excluding a dedicated PDCCH CORESET used for sending the response to the BFR from the base station to the UE from the plurality of PDCCH CORESETs.

8. At least one non-transitory machine-readable storage medium having instructions embodied thereon for a user equipment (UE) configured to perform beam failure recovery, the instructions thereon when executed by one or more processors at the UE perform the following:
encode a beam failure recovery (BFR) request for transmission on a physical random-access channel (PRACH) or a physical uplink control channel (PUCCH) to a base station;
monitor a dedicated physical downlink control channel (PDCCH) control resource set (CORESET) for a response from the base station after the UE sends the beam failure recovery request;
identify a candidate beam;
select a default physical downlink shared channel (PDSCH) beam, wherein the UE assumes that:
a same quasi co-location (QCL) assumption for a PDSCH as a QCL assumption for the dedicated PDCCH CORESET; or
a PDSCH demodulation reference signal (DMRS) is QCLed with a downlink (DL) reference signal (RS) of the candidate beam by the UE; and
decode a beam failure recovery request response received from the base station; and
monitor a plurality of PDCCH CORESETs after transmitting the beam failure recovery request, wherein to monitor the plurality of PDCCH CORESETs comprises:
  to monitor only the dedicated PDCCH CORESET for the base station response to the beam failure recovery request, and wherein the default PDSCH beam is a same beam used for the dedicated PDCCH CORESET for the base station response; and
  to monitor, for a remaining minimum system information (RMSI) or other system information (OSI) or paging, both the dedicated PDCCH CORESET for the base station response to the beam failure recovery request and one or more broadcast CORESETs, wherein the default PDSCH beam is a same beam used for a CORESET that includes downlink control information (DCI).

9. The at least one non-transitory machine-readable storage medium in claim 8, further comprising instructions, that when executed by one or more processors at the UE, perform the following:
assume the same QCL assumption for the PDSCH as the QCL assumption for the dedicated PDCCH CORESET after the UE starts to monitor the dedicated PDCCH CORESET for a response from the base station to the beam failure recovery request.

10. The at least one non-transitory machine-readable storage medium in claim 8, further comprising instructions, that when executed by one or more processors at the UE, perform the following:

assume the same QCL assumption for the PDSCH as the QCL assumption for the dedicated PDCCH CORESET after the UE transmits the beam failure recovery request.

11. The at least one non-transitory machine-readable storage medium in claim 8, further comprising instructions, that when executed by one or more processors at the UE, perform the following:
    assume the same QCL assumption for the PDSCH until at least one of a reconfiguration of a transmission configuration indicator (TCI) state for the PDCCH, an activation of the TCI state for the PDCCH, and a re-indication of the TCI state for the PDCCH.

12. The at least one non-transitory machine-readable storage medium in claim 8, wherein to monitor the plurality of PDCCH CORESETs comprises to:
    monitor all configured CORESETs including the dedicated PDCCH CORESET for base station response to beam failure recovery request, one or more broadcast CORESETs, and one or more previously configured unicast PDCCH CORESETs, wherein the default PDSCH beam is a PDCCH beam used for the dedicated PDCCH CORESET for the base station response or the default PDSCH beam is the PDCCH beam used for the PDCCH CORSET that includes the DCI.

13. The at least one non-transitory machine-readable storage medium in claim 12, further comprising instructions, that when executed by one or more processors at the UE, perform the following:
    decode the DCI received on the PDCCH CORESET after the UE transmits the beam failure recovery request;
    determine that a link has been recovered based on the DCI;
    cease re-sending a beam failure recovery request; and
    perform beam reporting to enable the base station to refresh a transmission configuration indicator (TCI) table for beam indication.

14. The at least one non-transitory machine-readable storage medium in claim 8, further comprising instructions, that when executed by one or more processors at the UE, perform the following:
    monitor a plurality of PDCCH CORESETs; and
    determine a lowest CORESET identification (ID) by excluding a dedicated PDCCH CORESET used for sending the response to the BFR from the base station to the UE from the plurality of PDCCH CORESETs.

15. The at least one non-transitory machine-readable storage medium in claim 8, further comprising instructions, that when executed by one or more processors at the UE, perform the following:
    select the default PDSCH beam when a scheduling offset between the PDCCH and the PDSCH is smaller than a selected threshold, k, wherein k is a real number before the base station sends response to beam failure recovery request or before the base station receives the beam failure recovery request.

16. The at least one non-transitory machine-readable storage medium in claim 8, further comprising instructions, that when executed by one or more processors at the UE, perform the following:
    select the default PDSCH beam by excluding:
        a broadcast PDCCH CORESET, including a CORESET for remaining minimum system information (RMSI), or other system information (OSI), or paging.

17. The at least one non-transitory machine-readable storage medium in claim 8, further comprising instructions, that when executed by one or more processors at the UE, perform the following:
    select the default PDSCH beam by excluding:
        a dedicated PDCCH CORESET (CORESET-BFR) for base station response to the beam failure recovery request.

18. The at least one non-transitory machine-readable storage medium in claim 8, further comprising instructions, that when executed by one or more processors at the UE, perform the following:
    monitor the PDCCH CORESET(s) after transmitting the beam failure recovery request wherein monitoring comprises:
        monitor only the dedicated PDCCH CORESET (CORESET-BFR) for the base station response to the beam failure recovery request, wherein a default PDSCH beam is a same beam used for the dedicated PDCCH CORESET (CORESET-BFR) for the base station response;
        monitor both the dedicated PDCCH COREST (CORESET-BFR) for the base station response to the beam failure recovery request and one or more broadcast CORESET(s), including one or more CORESET(s) for a remaining minimum system information (RMSI), other system information (OSI), or paging, wherein the default PDSCH beam is a same beam used for a CORESET that includes downlink control information (DCI);
        monitor all configured CORESETS including the dedicated PDCCH CORESET (CORESET-BFR) for base station response to beam failure recovery request, one or more broadcast CORESETs, and one or more previously configured unicast PDCCH CORESETs, wherein the default PDSCH beam is a PDCCH beam used for the dedicated PDCCH CORESET for the base station response or the default PDSCH beam is the PDCCH beam used for the PDCCH CORSET that includes the DCI.

19. The at least one non-transitory machine-readable storage medium in claim 18, further comprising instructions, that when executed by one or more processors at the UE, perform the following:
    decode the DCI received on the PDCCH CORESET after the UE transmits the beam failure recovery request;
    determine that a link has been recovered based on the DCI;
    cease re-sending a beam failure recovery request; and
    perform beam reporting to enable the base station to refresh a transmission configuration indicator (TCI) table for beam indication.

* * * * *